Dec. 6, 1949 F. L. RUPLEY 2,490,376
APPARATUS FOR GAUGING TAPERED WORKPIECES
Filed March 27, 1947 4 Sheets-Sheet 1
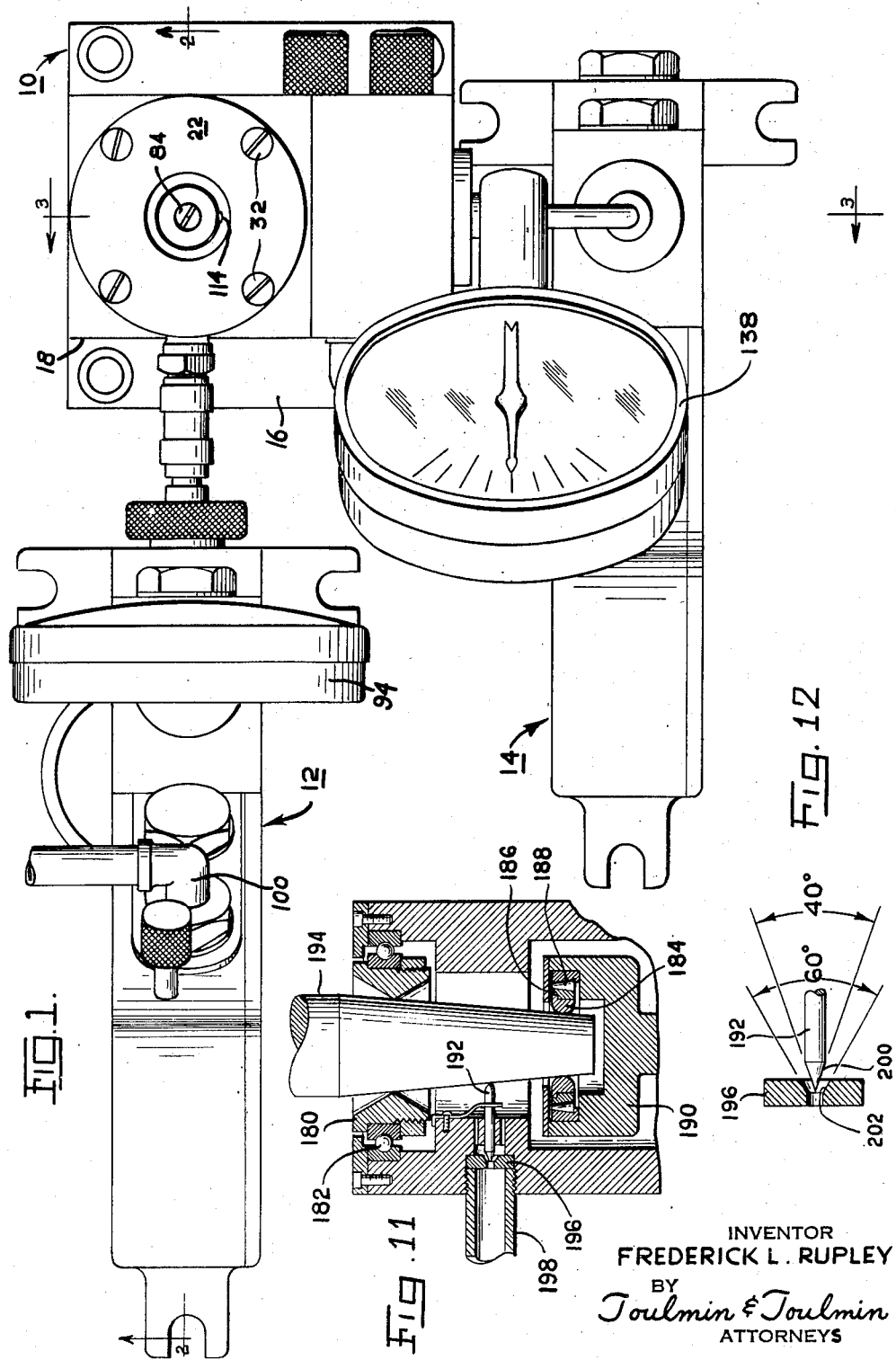
INVENTOR
FREDERICK L. RUPLEY
BY
Toulmin & Toulmin
ATTORNEYS Dec. 6, 1949   F. L. RUPLEY   2,490,376
APPARATUS FOR GAUGING TAPERED WORKPIECES
Filed March 27, 1947   4 Sheets-Sheet 2
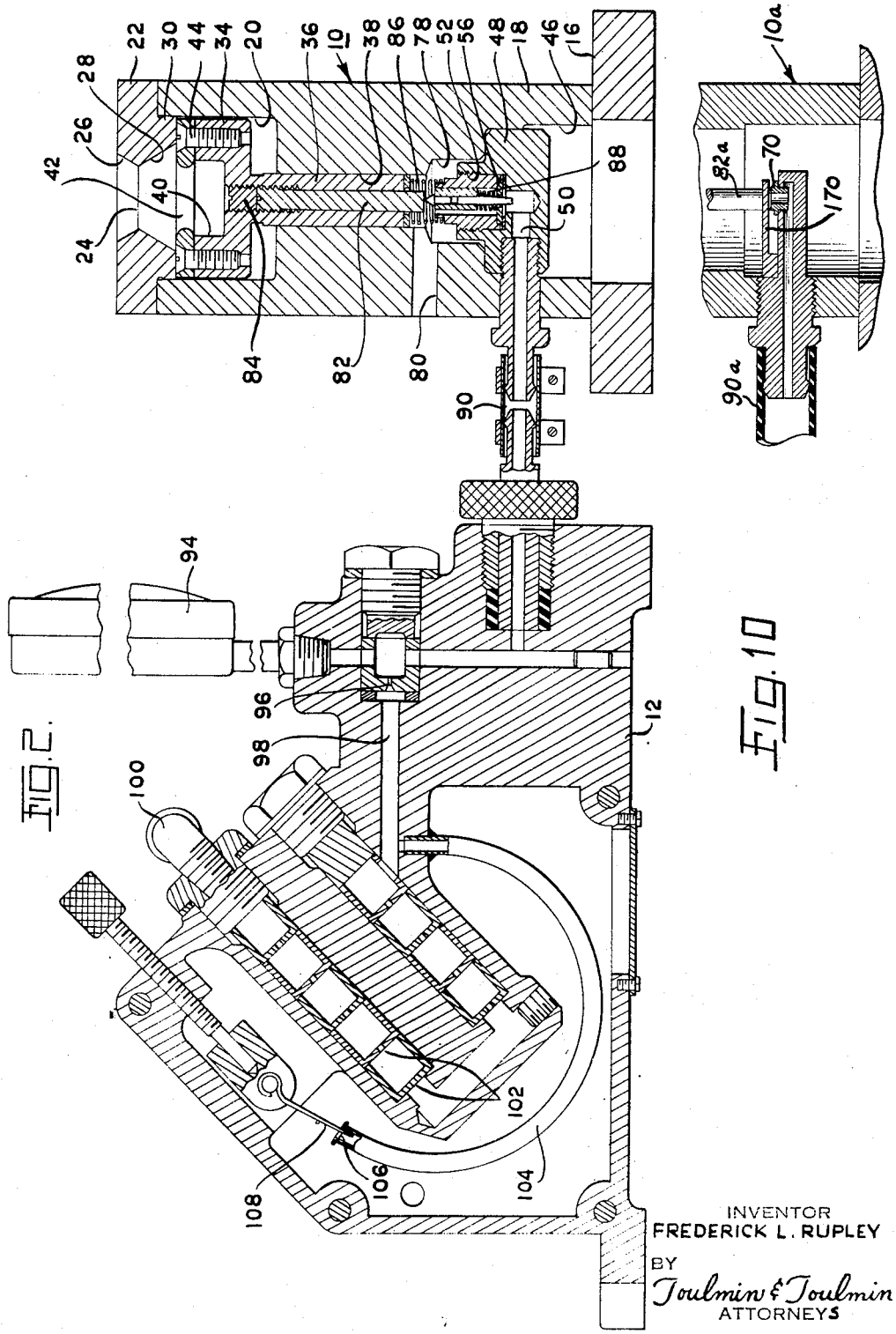
INVENTOR
FREDERICK L. RUPLEY
BY
Toulmin & Toulmin
ATTORNEYS Dec. 6, 1949     F. L. RUPLEY     2,490,376
APPARATUS FOR GAUGING TAPERED WORKPIECES
Filed March 27, 1947     4 Sheets-Sheet 3
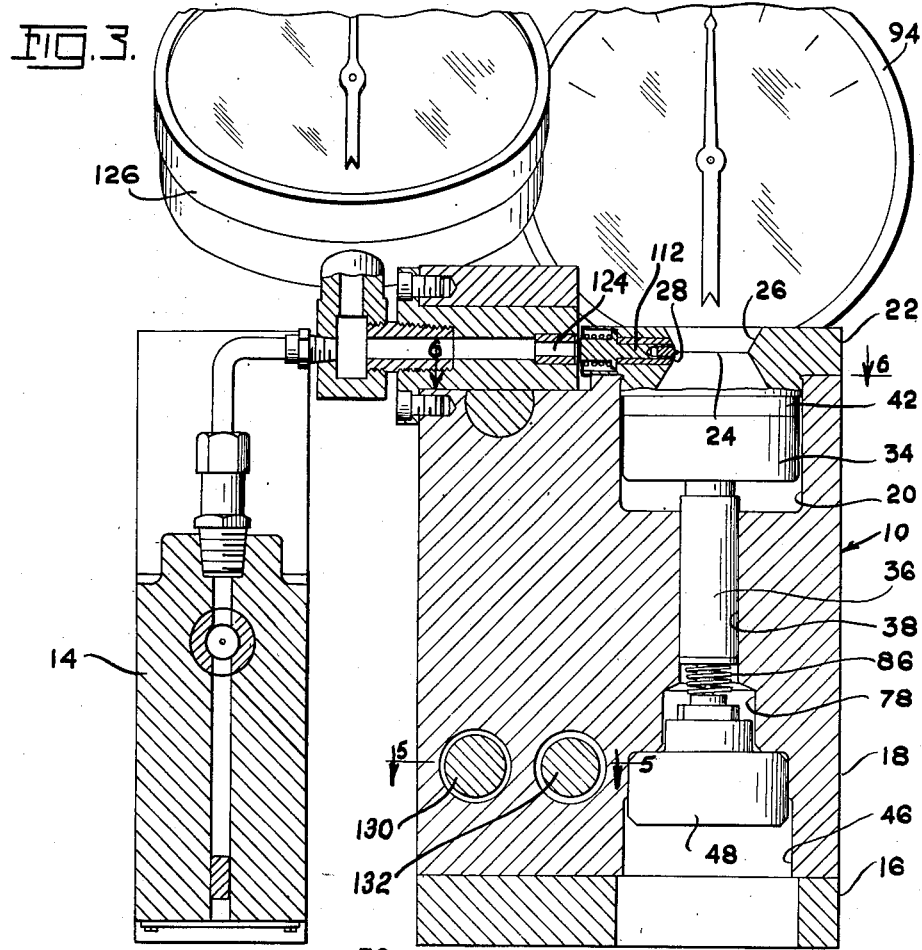
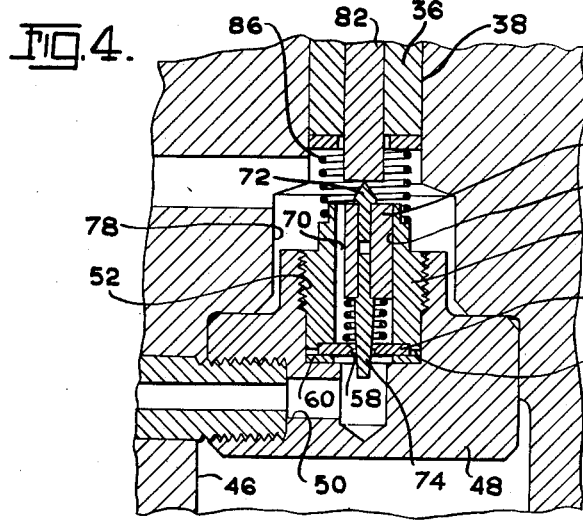
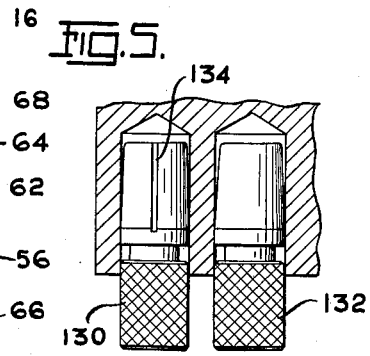
INVENTOR
FREDERICK L. RUPLEY
BY
Toulmin & Toulmin
ATTORNEYS Dec. 6, 1949  F. L. RUPLEY  2,490,376
APPARATUS FOR GAUGING TAPERED WORKPIECES
Filed March 27, 1947  4 Sheets-Sheet 4
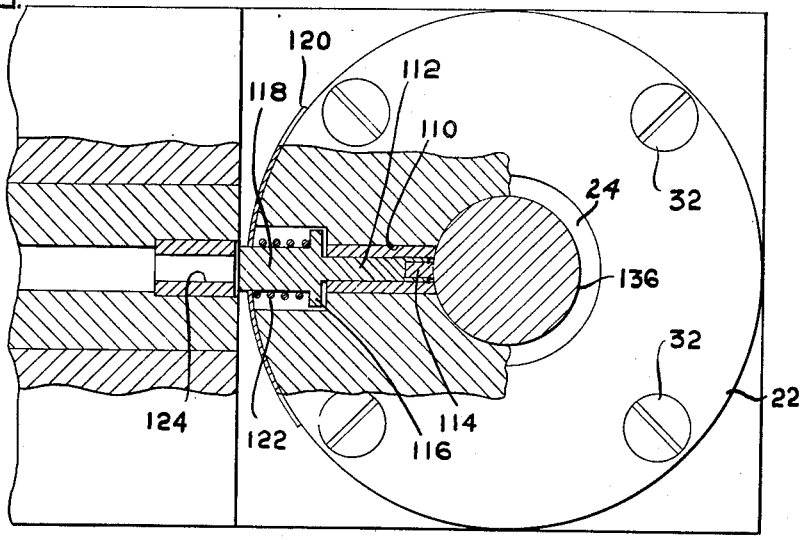
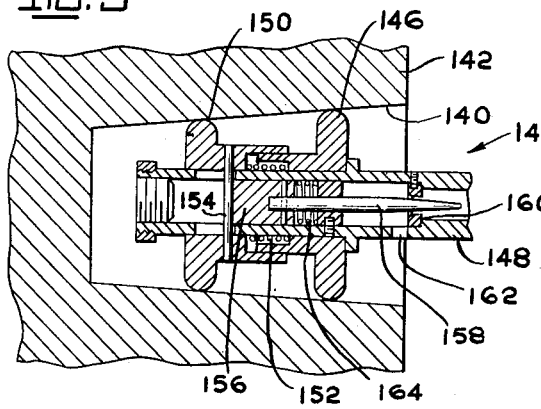
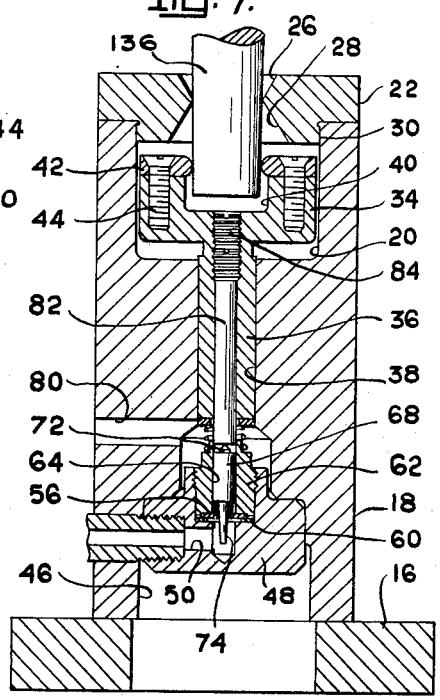
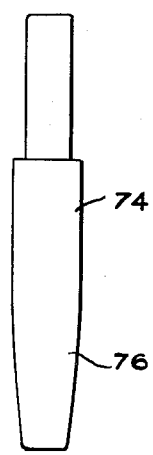
INVENTOR
FREDERICK L. RUPLEY
BY
Toulmin & Toulmin
ATTORNEYS Patented Dec. 6, 1949

2,490,376

UNITED STATES PATENT OFFICE 2,490,376

APPARATUS FOR GAUGING TAPERED WORKPIECES

Frederick L. Rupley, Cincinnati, Ohio, assignor to Merz Engineering Company, Indianapolis, Ind., a corporation of Indiana Application March 27, 1947, Serial No. 737,503

2 Claims. (Cl. 33—174)

1

This invention relates to gauging methods and apparatus and particularly to a method and apparatus for gauging tapered workpieces.

The gauging of tapered members such as drill shanks, tapered adapters, tapered reamers, etc., is ordinarily accomplished by attempting a direct measurement of the angle thereof. Such a measurement is difficult to make with accuracy and speed and is thus not applicable to production processes. Also, the usual arrangement for measuring tapers measures only the angle of the side of the taper, or the included angle between the sides thereof, and does not give an indication as to whether the workpiece is perfectly round.

The primary object of the present invention is to provide an improved method and apparatus for gauging tapered work members which is quick, accurate and readily adaptable for production inspecting.

A still further object of the present invention is to provide in combination with a gauge according to the foregoing object an auxiliary gauging device which is operable to measure the eccentricity of the workpiece.

Still another object is to provide an improved method and apparatus for gauging both the degree of taper and the eccentricity of the tapered work member and without the necessity of making precise measurements of the taper angle directly.

A still further object is the provision of a gauging device for gauging tapers which is operated by compressed air.

Another object is the provision of a method and apparatus for gauging tapered work members such that the range of the gauge can easily be modified.

These and other objects and advantages will become more apparent upon reference to the following description taken in connection with the accompanying drawings in which:

Figure 1 is a plan view of the gauging mechanism according to this invention;

Figure 2 is a vertical longitudinal section indicated by the line 2—2 on Figure 1;

Figure 3 is a transverse section indicated by the line 3—3 on Figure 1;

Figure 4 is an enlarged sectional view showing the portion of the air gauge which is influenced by the taper angle;

2

Figure 5 is a plan section indicated by the line 5—5 on Figure 3 and showing the masters which accompany the gauge;

Figure 6 is a plan section indicated by the line 6—6 on Figure 3 and showing the portion of the air gauge which measures the eccentricity of the work member;

Figure 7 is a view of the taper gauging portion of the device with a workpiece inserted and being gauged;

Figure 8 is an enlarged view of the orifice varying member of the taper gauge part of the device;

Figure 9 is a fragmentary view showing an inversion of the taper gauging part of the gauge modified for use with tapered holes or recesses;

Figure 10 is a fragmentary view similar to Figure 4 but showing the gauging port opening directly into the atmosphere and the port varying member located externally therefrom;

Figure 11 is a fragmentary view of a modified form of ring mounting in which the rings are anti-frictionally mounted for rotation with the tapered pin engaging the work between the two rings; and Figure 12 is a view of an aperture plate and tapered pin construction which has given very satisfactory results in actual tests.

According to this invention tapered work members are gauged as to the degree of taper thereon by engaging the work member by a pair of spaced rings of different diameters. One of the rings is movable relative to the other by the workpiece being gauged, and the movement thereof is utilized for varying the air flow from an air gauge which is responsive to changes in flow therethrough for indicating workpiece sizes.

Simultaneously with the gauging operation described above, there is an auxiliary gauging member which bears on the periphery of the workpiece being gauged at the point where it is engaged by one of the rings. Then, when the workpiece is rotated while in engagement with the rings, the last mentioned gauging element is actuated and indicates, through another air gauge, the degree of eccentricity or out of roundness of the workpiece.

An inversion of the taper measuring portion of the gauge may be had by providing annular members instead of open rings, and inserting the said annular members into a tapered hole or recess. In the same manner as in connection with the tapered workpiece, the annular rings engage the surface of the tapered hole and are moved relatively thereby, this relative movement serving to actuate an orifice varying gauging member which, through an air gauge, results in an indication of the degree of taper of the hole being measured.

Referring to the drawings and particularly to Figures 1 through 7 thereof, a gauge according to this invention comprises a gauging head generally indicated at 10 to which is connected the indicating air gauge mechanisms 12 and 14. The air gauge at 12 indicates the degree of taper of the workpiece being measured while the gauge at 14 indicated the out of roundness or eccentricity thereof.

The head 10 consists of a base member 16 on which is mounted a block or body portion 18. The upper end of the block 18 is bored as at 20 and there is mounted on the upper surface thereof the ring 22. The ring 22 has an accurately machined aperture 24 therein which is defined by the intersecting conical recesses 26 and 28. The ring 22 also has a depending boss 30 thereon which closely fits within the bore 20 of the body 18. The ring 22 is preferably tightly held in position on the body 18 as by a plurality of screws 32.

Also positioned within the bore 20 is a part 34 substantially T-shaped in vertical cross-section and having a projecting rod portion 36 thereon which slidably fits within a bore 38 in the body 18. The upper end of the member 34 is enlarged and has a counterbore 40. Mounted on the upper face of the member 34 and somewhat overlying the counterbore 40 is a second ring 42 which is secured to the said member 34 as by the screws 44 and which has its inner surface arcuately shaped.

The body 18 is also bored upwardly from the bottom as at 46 and secured within the recess 46 is a block 48. The block 48 has a passage therethrough which opens through the side of the block as at 50 and through the top of the block as through the threaded recess 52. The recess 52 is shouldered, and resting on the bottom thereof is an orifice plate 56 having the orifice 58 therein. A gasket 60 may be provided between the orifice plate and the bottom of the recess 52 to prevent the escape of air therearound during the operation of the gauge.

The plate 56 is held in position and clamped against the gasket 60 by the hollow plug 62 which threads into the recess 52 and which is centrally axially bored as at 64. Preferably, the lower end of the plug 62 has an annular ledge 66 thereon which encloses the plate 56 and thereby aligns the orifice 58 thereof with the axis of the bore 64.

Slidably mounted in the bore 64 is a slide block 68 which is fluted along the sides as at 70 to permit the passage of air therearound. Carried in the upper end of the slide block 68 is a pointed member 72 and in the lower end thereof there is a tapered pin 74. The tapered pin extends through the port 58 and is adapted for variably restricting the said port as the slide block is reciprocated in the bore 64.

As best seen in Figure 8, the tapered pin 74 comprises a tapered end portion 76 the sides of which are arcuately shaped so that the restricting of the port 58 is varied in a predetermined manner in response to predetermined axial movements therein of the pin 74. By means of the shape of the portion 76 of the pin 74, the characteristics of the scale of the indicating portion of the air gauge can be controlled.

The bore 38 is connected with the bore 46 by an intermediate portion 78 which is vented to the atmosphere by the cross drill 80 so that air escaping from the orifice 58 and around the metering pin 74 can freely pass to the atmosphere.

The pointed member 72 is normally in engagement with an elongated screw 82 which passes through the rod part 36 of the member 34. The screw 82 is adjustable in the rod part 36 and is adapted for being locked in any position of adjustment by the set screw 84.

The assembly of the member 34, ring 42 and screw 82 is continuously urged upwardly into its Figure 2 position and against the lower surface of the ring 22 by a compression spring 86 which bears between the lower end of the rod portion 36 and the upper surface of the plug 62. Similarly, the slide block 68 and the pointer member 72 and the metering pin 74 carried thereby are continuously urged upwardly into engagement with the lower surface of the screw 82 and into a position of minimum restriction of the orifice 58 by a compressing spring 88 bearing between the lower surface of the slide block and the upper surface of the plate 56.

Fluid under pressure is supplied to the block 48 by the conduit 90 leading from the air gauge 12. The conduit 90 communicates directly with the indicating gauge 94 and thereafter through a master orifice 96 of exactly predetermined diameter with a chamber 98. The chamber 98 is supplied with compressed air from a supply line 100 and through a plurality of serially arranged throttling orifices 102. The chamber 98 is also variably connected with the atmosphere by the Bourdon tube 104 which has a port 106 in the end thereof and into which extends a tapered metering pin 108.

As the tube 104 yields due to an increase in pressure therein, the effective size of the port 106 is increased due to the withdrawal of the tapered pin therefrom and the exhausting of air to the atmosphere increases. Together with the throttling orifices 102 and a controlled line pressure, the pressure in the chamber 98 is predetermined to within very close limits. This results in a predetermined rate of flow through the master orifice 96, and through the orifice 58 to the atmosphere. Thus, when the metering pin 74 is moved to restrict the orifice 58, this is immediately reflected as an indication on the indicating instrument 94.

Referring to Figures 3 and 6, it will be seen that the ring 22 is laterally bored as at 110 to receive a reciprocable gauging element 112, the end of which toward the aperture 24 of the ring 22 preferably is tipped with a wear resistant element such as the ruby indicated at 114. The other end of the element 112 is flanged as at 116 and has its end 118 extending through a thin plate or strip 120. Between the plate 120 and the flange 116 there bears a spring 122 which continuously urges the gauging element 112 toward the right. Spaced from the end 118 of the element 112 is a port 124 adapted for being variably restricted by the said end when the element 112 is moved.

Normally, the right end of the element 112 extends into the aperture 24 so that when a workpiece to be gauged is inserted into the aperture, the gauging member 112 is moved leftwardly to give a predetermined restriction of the port 124. This is reflected in a predetermined reading on the indicator 126 of the air gauge 14 which is similar in construction to the gauge 12, described above. Thereafter, if the piece being gauged is turned in the ring 22 any flats thereon or out of roundness thereof will cause the gauging element 112 to move thereby to vary the restriction of the port 124 to give a reading on the indicator 126.

Operation

In operation, the proper setting of the air gauge 12 is determined by selecting one of the master or standard tapers 130 or 132 which may be conveniently located in recesses in the block 18. One of these standards represents the high limit of the workpieces to be measured and the other thereof represents the low limit. On one of the standards there is a flat as indicated at 134 on the standard 130 and this flat is for the purpose of adjusting the air gauge 14. The gauge is set up by means of the standards and, thereafter, workpieces which are placed in the gauge as, for example, the workpiece 136 in Figure 7, will substantially immediately be gauged as to degree of taper and the indication on the dial 94 will determine whether or not the workpiece is acceptable.

By rotating the workpiece 136 while it is in its Figure 7 position, the air gauge 14 will be actuated through movement of the gauging member 112 and the amount that the workpiece is out of round or the size of any flats or imperfections therein will be indicated by the dial of the instrument 126 associated with the gauge 14.

The range of the instrument can be changed at any time by replacing one or both of the rings 22 and 42 and by replacing the standards by other standards having the proper diameter and degree of taper.

As mentioned previously, this instrument may be inverted for the purpose of gauging tapered recesses and an arrangement of this type is shown in Figure 9. In Figure 9 there is a tapered recess 140 in a workpiece 142 and a gauging head generally indicated at 144 as being employed for measuring the taper angle of the recess. The gauge head comprises a larger annular ring at 146 which is carried on the tube 148, and the smaller annular ring 150 which is slidably carried on the said tubing and in advance of the ring 146. A compression spring 152 continuously urges the rings apart and extending through the tube 148 is a pin 154 which is fastened to the ring 150. The pin 154 abuts or is connected with a slide block 156 which carries a tapered pin 158 that extends through the orifice plate 160.

The chamber through which the pin 158 passes is vented as at 162 to exhaust the air discharged through the orifice plate 160 to the atmosphere. A spring 164 may be employed, if desired, for continuously urging the slide block 156 against the pin 154 if the said pin and block are not otherwise secured together.

It will be evident that the operation of the modification shown in Figure 9 is substantially identical with that of the external taper gauge and that the air gauge mechanism which would be connected with the tube 148 could be identical with either the gauge 12 or 14.

Figure 10 illustrates a modified form of the invention which eliminates the tapered pin 74 and aperture plate 56. As shown, the air flow from tube 90a is restricted at the gauging button 70 by spring plate 170, which in turn is actuated by vertical movement of the elongated screw 82.

In Figure 11 the ring 180 is mounted for rotation on the anti-friction bearing 182. Ring 184 has secured thereto, as by shrinking or other means, the inner race 186 of the tapered bearing 188. The other race of the said bearing is secured in the T-shaped member 190, the remaining structure and function of which is the same as the member 34 of Figure 7.

Located substantially mid-way between rings 180 and 184 is the gauging finger 192, spring held against the workpiece 194 and adapted to vary the flow of air through the aperture plate 196. Pipe 198 communicates with the gauge 14 and it will be apparent that upon rotation of the workpiece any flats or imperfections which would result in variations in the respective positions of the members 192 and 196 will be indicated on the dial 126.

Referring to Figure 12, it has been found through extensive tests that the dimensional arrangement between the aperture plate 196 and the flow controlling element 194 produces very satisfactory results. As shown, the point 200 is ground to an angle of approximately 40° to cooperate with a counterbore 202 at an angle of 60°.

From the foregoing it will be seen that the present invention provides for an accurate and rapid means for determining all of the essential characteristics of a tapered work member whether internal or external, and that the device is relatively simple and rugged in construction, thereby adapting it to inspection processes in shops and factories.

It will be understood that this invention is susceptible to modification in order to adopt it to different usages and conditions and, accordingly, it is desired to comprehend such modifications within this invention as may fall within the scope of the appended claims.

I claim:

1. In a gauge for measuring outside tapers; a pair of rings of different diameters in axial alignment; means urging said rings toward each other whereby their inner edges define a wide angle taper; and means responsive to separating movements of said rings by the engagement of both thereof by a workpiece having a smaller angle taper when introduced through the larger of the rings for indicating the degree of taper of the workpiece, said last named means including a body and a bore in said body, said bore being in axial alignment with a work piece when the same is in measuring position, an air conduit extending to said body, a gasket, a hollow plug having a central bore, an orifice plate having an orifice therein, a pin extending into said orifice, said plug having a ledge, a plate enclosed by said ledge to thereby align the orifice with the bore of the hollow plug, and an elongated member extending into said first named bore and adapted to actuate said pin and gasket.

2. In a gauge for measuring outside diameters; a fixed larger ring; a smaller movable ring in axial alignment with said larger ring; means urging said rings toward each other whereby their inner edges define a wide angle taper; and means responsive to separating movements of said rings by the engagement of both thereof by a workpiece having a smaller angle taper when introduced through the larger of the rings for indicating the degree of taper of the workpiece, said last named means including a body and a bore in said body, said bore being in axial alignment with a workpiece when the same is in measuring position, an air conduit extending to said body, a gasket, a hollow plug having a central bore, an orifice plate having an orifice therein, a pin extending into said orifice, said plug having a ledge, a plate enclosed by said ledge to thereby align the orifice with the bore of the hollow plug, and an elongated member extending into said first named bore and adapted to actuate said pin and gasket.

FREDERICK L. RUPLEY.

REFERENCES CITED

The following references are of record in the file of this patent:

UNITED STATES PATENTS

| Number | Name | Date |
|---|---|---|
| 785,739 | Kettnich | Mar. 28, 1905 |
| 1,472,195 | Schlaupitz | Oct. 30, 1923 |
| 1,543,244 | Blood | June 23, 1925 |
| 1,602,645 | Buckingham | Oct. 12, 1926 |
| 2,011,931 | Dreyer | Aug. 20, 1935 |
| 2,370,220 | Aller | Feb. 27, 1945 |
| 2,374,154 | Moore | Apr. 17, 1945 |
| 2,397,494 | Kuppersmith | Apr. 2, 1946 |
| 2,405,648 | Gray | Aug. 13, 1946 |
| 2,417,148 | Wright | Mar. 11, 1947 |

OTHER REFERENCES

Product Eng., pp. 96–97, Jan. 1947.